June 11, 1968  N. K. MOSES ETAL  3,387,781
RAIL ANCHOR AND RAIL SEAT CONSTRUCTION
Filed Nov. 23, 1966  3 Sheets-Sheet 1
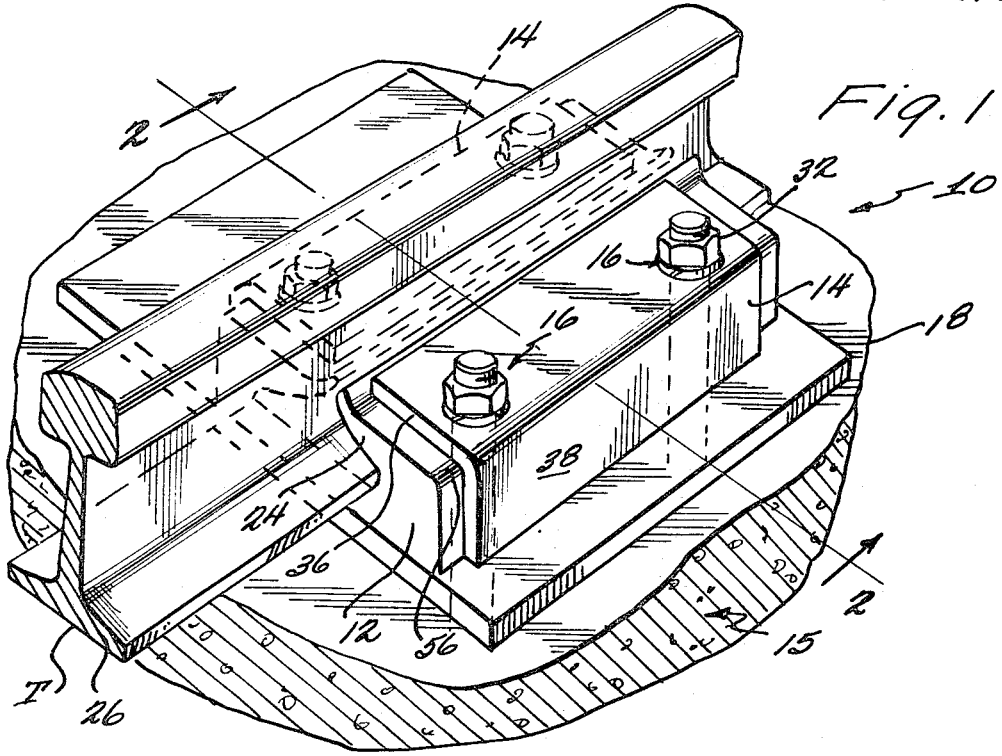
Fig. 1
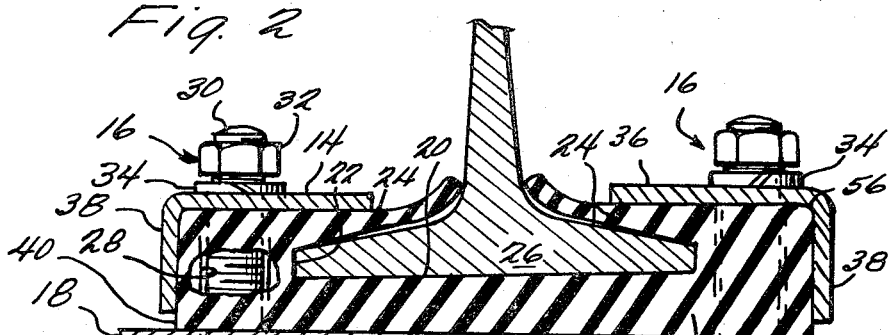
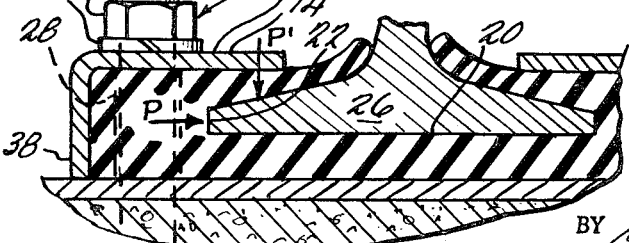
INVENTORS
NELSON K. MOSES
ROBERT A. McCLUNG
BY Cushman, Darby & Cushman
ATTORNEYS

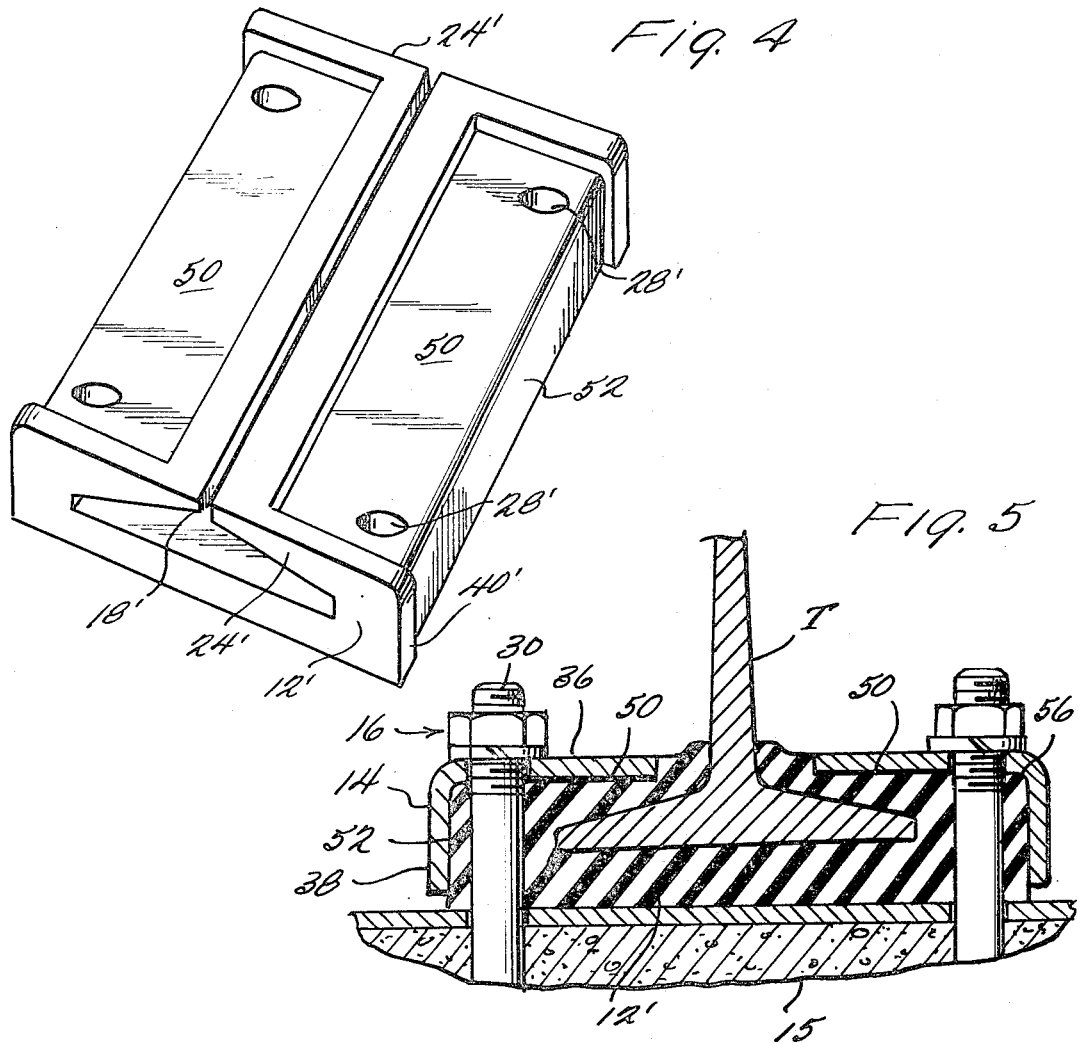
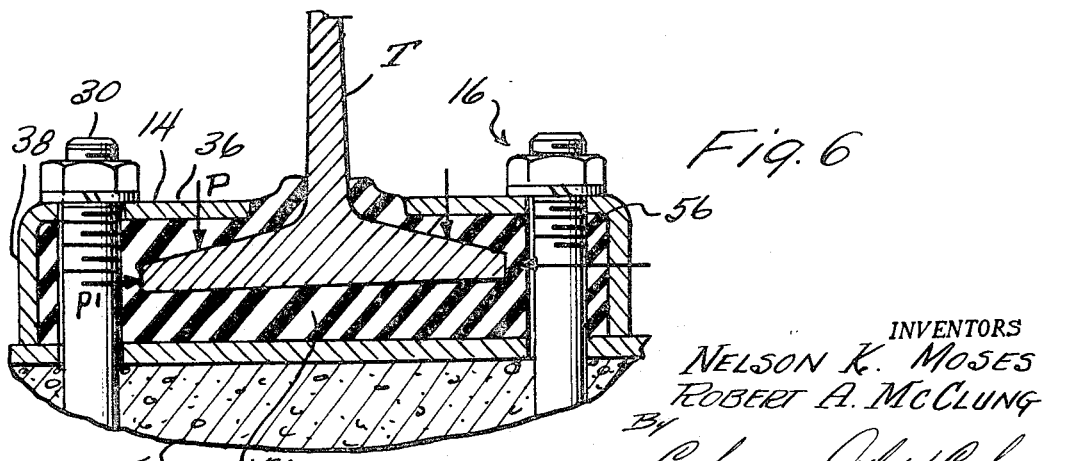

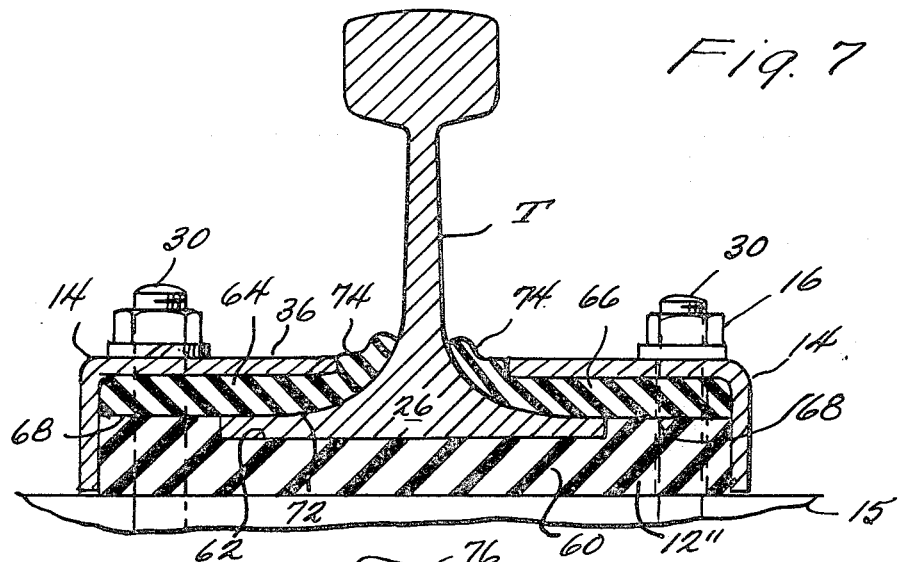
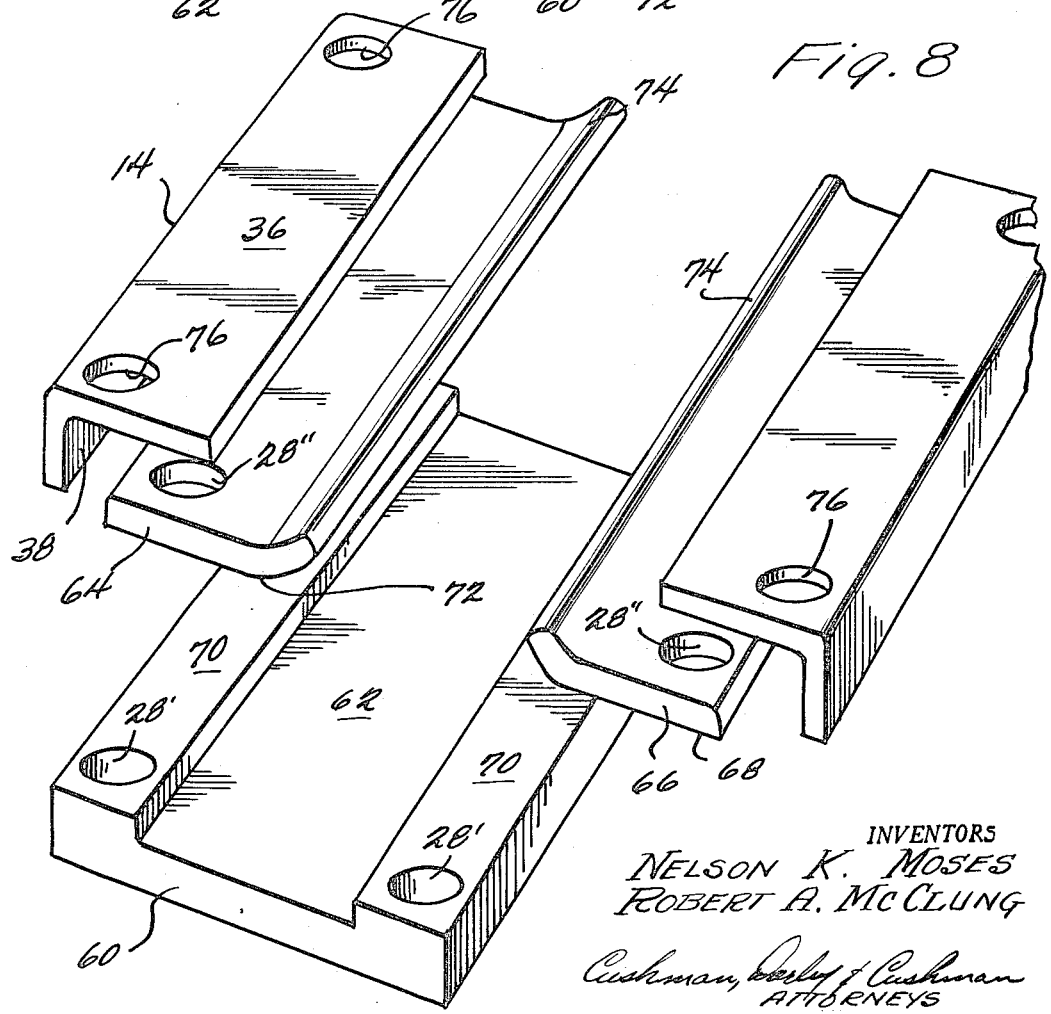

3,387,781
RAIL ANCHOR AND RAIL SEAT
CONSTRUCTION
Nelson K. Moses, Ashtabula, Ohio, and Robert A. Mc-
Clung, West Palm Beach, Fla., assignors to Railroad
Rubber Products, Inc., Ashtabula, Ohio, a corporation
of Florida
Filed Nov. 23, 1966, Ser. No. 596,659
10 Claims. (Cl. 238—283)

ABSTRACT OF THE DISCLOSURE

An improved rail anchor and seat construction is described wherein a preformed resilient rail seat receives and supports the base flanges of a traction rail on a supporting structure, and the resilient rail seat and traction rail are secured to the supporting structure by a combination of bolt means and angle-shaped plates which confine the marginal edges of the resilient rail seat so that there is no cold flow or displacement of the resilient rail seat outwardly from the traction rail when the bolt means are drawn down tightly for anchoring the resilient rail seat and the traction rail relative to the supporting structure. The angle-shaped plates each have a first leg arranged to overlie a marginal lip portion of the resilient rail seat, and a second leg overlies substantially all of a longitudinally extending side wall portion of the resilient rail seat.

---

The present invention relates to an improved track structure for railroads, transit systems, or the like and, more particularly, to an improved rail anchor and seat construction for anchoring track rails against longitudinal slip and lateral deflection, the construction being such that the traction rails may or may not be insulated from the traction supporting structure if so desired.

The track structure of the present invention is an improvement over the rail seat and track structure disclosed in U.S. Patent No. 3,268,170 to Nelson K. Moses and issued August 23, 1966. In the aforementioned Patent No. 3,268,170 there is disclosed a track structure which provided an improved resilient insulating rubber rail seat that not only served to cushion impact loads of rolling stock and increase longevity of the track structure but would further insulate the rail from the track supporting structure against a potential of 40,000 volts or more. In the aforementioned patent, there is provided a resilient rail seat formed of elastomeric material, the rail seat having a rail base flange receiving cavity in its upper surfaces defined by lips on the rail seat overlying marginal portions of the base flange of a traction rail positioned therein. A bearing plate positioned on the upper surface of each of said lips and overlying the rail base flange, applied a continuous line of pressure on the rail base flange when bolt means anchored to the supporting structure were utilized to apply a positive pressure on the elongated bearing plates.

While the track structure of the aforementioned patent has proved quite satisfactory for its intended purposes of eliminating longitudinal creeping of the traction rails as well as insulating the traction rails from the supporting structure, it has been found that such track structure did encounter some difficulties in eliminating bolt bending and wear of the resilient rail seats from lateral rail load deflection. Because the resilient rail seat was made of an elastomeric material which has cold flow under too much pressure, high torques could not be applied to the hold-down bolting means for the bearing plate. The wear caused by the lateral rail load deflection results in the bolt means losing the torque initially applied, thus necessitating constant maintenance to reapply torque thereto. Additionally, the lateral loads applied to the rails were taken by the bolts, this often causing the bolts to bend. When bolt bending occurred, the gauge of the track structure was affected.

Accordingly, an object of the present invention is to provide an improved track structure wherein resilient rail seats may be used but wherein higher torque may be applied to the bolt means for fastening down the assembly without overly deforming the resilient rail seat.

Another object of the present invention is to provide an improved track structure utilizing a resilient rail seat, with means for boxing in such a seat so that pressure is applied not only downwardly along a continuous line on the rail base flange but inwardly toward the base flange of the rail along a continuous line.

Ancillary to the immediately preceding object, it is a further object of the present invention to provide an improved construction wherein high maximum torques may be initially applied to the hold-down bolt means without materially deforming the resilient rail seat in its confinement.

Still another object of the present invention is to provide a rail anchor and seat construction in which the traction rail may be easily removed and replaced from the resilient supporting rail seat.

Another object of the present invention is to provide an improved resilient rail member for supporting a traction rail on a rail supporting structure, the rail seat member being formed from a number of individual parts and held in position by means of an angle-shaped bearing plate which boxes the rail seat along its top surface and along its longitudinal side surface.

A still further object of the present invention is to provide an improved rail support structure in which lateral loads are not taken by the bolt means, thus resulting in the track structure maintaining proper gauge.

These and other objects and advantages of the present invention will appear more fully in the following specification, claims and drawings in which:

FIGURE 1 is a perspective view, partly in section, of the present invention illustrating the rail seat, bearing plates and bolt means of the present invention;

FIGURE 2 is an enlarged section view taken substantially on the line 2—2 of FIGURE 1, the view illustrating the base flange of a traction rail in position within the cavity of the rail seat, the bearing plates in position, and the bolt means in position but with no torque applied;

FIGURE 3 is a view similar to FIGURE 2, but the view illustrating the position of the bearing plates once torque has been applied to the bolt means;

FIGURE 4 is a perspective view of a modified rail seat for use with the track structure of FIGURE 1;

FIGURE 5 is a sectional view of a track structure utilizing the modified pad of FIGURE 4 prior to torque being applied to the bolt means;

FIGURE 6 is a view similar to FIGURE 5 but illustrating the position of the bearing plates after torque has been applied to the bolt means;

FIGURE 7 is a further modification of the track structure of FIGURE 1 and, more particularly, a modification of the resilient rail seat, the view being a sectional view of the same; and FIGURE 8 is an exploded view of the elements making up the track structure of FIGURE 7, the bolt means and the traction rail being omitted for the purpose of clarity.

Referring now to the drawings wherein like characters or reference numerals represent like or similar parts, the construction of track structure of the present invention is best shown in FIGURE 1 and is generally designated by the numeral 10. The construction of track structure 10 includes a resilient rail seat 12, a pair of angle-shaped bearing plates 14 and bolt means 16. The supporting structure for the traction rail T which forms the roadbed for the same may be of concrete as shown at 15 with steel tie plates 18 suitably positioned thereon. Alternatively, the tie plates 18 may be omitted where the surface of the concrete roadbed is provided with a smooth upper surface or in place of the supporting structure 15 of concrete, the supporting structure may be either a steel decking such as found on bridges, tunnels, rail crossings, electronic scales, and the like. Additionally, the traction rail supporting structure 15 may be the conventional roadbed type using ballast and wooden ties. It will be understood that the construction just heretofore broadly described is positioned to support the traction rail T at predetermined intervals, for example, in sixteen inch centers throughout the length of the rail or continuously throughout the length of the rail.

The resilient rail seat 12 may be of the type disclosed in aforementioned U.S. Patent No. 3,268,170 or it may be of modified construction as shown in FIGURES 4 and 7. In more detail, the rail seat is made of an elastomeric material, preferably having a primary ingredient of a natural butyl rubber with or without a secondary ingredient or a rubber like substance such as neoprene or the like, the rail seat having resistance to deterioration from oil, grease, weather or the like. The pad 12 is capable of insulating against a 40,000 volts potential although the normal electrical railway system generally utilize only 25,000 volts.

Rail seat 12 is preferably rectangular in shape and is provided with a longitudinally extending groove 20 which is formed with an undercut longitudinal edge portion 22 so as to define a rail base flange receiving cavity. Since the groove 20 is undercut as indicated at 22, the resilient rail seat provided with a pair of inwardly oppositely disposed lips 24 which in the FIGURES 1 and 4 environment are integral with the rail seat body and are arranged to overlie a portion of the rail base cavity and to also overlie a portion of a base flange 26 of the traction rail T when the traction rail is positioned in the rail seat. Preferably the rail base receiving cavity in the resilient rail seat 12 has a cross-sectional dimension complementary to and at least as great as but preferably slightly greater than the complementary cross-sectional dimension of the rail base and flange 26 of traction rail T so that it is easier to apply the rail seat to the rail and also so that no stresses are set up in the rail seat at their junction with the body of the rail seat.

As best illustrated in FIGURE 2, the resilient rail seat 12 is provided with pre-punched holes 28 at each of its corners for reception of bolts 30 of the bolt means 16. The bolt receiving holes 28, although not shown in the drawings as such for the purpose of clarity, have a diameter slightly less than the diameter of the hold-down bolts are urged through the holes to anchor the resilient rail seat to the supporting structure 15, the elastomeric material about the holes 28 is extended and a positive pressure is exerted on the bolts thus providing a seal against leakage through the bolt holes. Greater or lesser dimensions of the holes may be employed in the rail seat where necessary or desirable for other uses. Additionally, it will be noted that the holes 28 are spaced from the outer most edges 22 of the rail base receiving cavity to prevent a break through or leakage of electrical current to the bolt means 16 when the rail seat is used in electric rail systems or where the track structure must be insulated. The distance between the wall of the prepunched hole 28 and the flange base receiving cavity is in the order of three-eighths of an inch.

The hold-down bolts 30 of bolt means 16 are anchored in the supporting structure 15 in any suitable manner, the bolts being exteriorly threaded for the reception of a nut 32. Positioned between the nut 32 and the angle-shaped bearing plate 14 is the usual lock washer 34.

The angle-shaped bearing plate 14 is provided with one leg 36 arranged to abut the outer upper surface of the lip portions 24 of rail seat 12 and a second leg 38 arranged to abut the longitudinal side wall or edge 40 of the rail seat. It will be noted by reference to FIGURE 2 that the leg 36 of the bearing plate 14 has its free longitudinal edge spaced inwardly from the edge of the lip 24 so that when positive pressure is applied to the plate 14 by the bolt means 16, the longitudinal edge is spaced from the web of the traction rail by a portion of the lips 24 of rail seat 12. This is important when the bearing plate 14 is made of steel and it is desired to provide an insulating construction and also where it is desired to dampen noise of the rolling stock. On the other hand, when the bearing plate 14 is made from an insulating or non-ferrous material such as nylon, fiberglass, Teflon, urethane or fiber composition, the positioning of the edge of plate 14 with respect to the lips 24 is not necessarily as critical although it is desirable from a noise standpoint.

The leg 38 of the bearing plate 14 which is arranged to engage the side wall or longitudinal edge 40 of the rail seat 12 has a length as shown in FIGURE 2 which is slightly less than the height of the rail seat 12 when the rail seat is in its relaxed condition. The purpose of making the leg 38 slightly shorter than the height of the rail seat is to permit the rail seat to be compressed so that there can be some cold flow of the rail seat in a longitudinal direction. Once a positive downward pressure is applied to the bearing plate 14, the leg 38 will nearly abut the upper surface of the tie plate 18 or supporting structure 15 as the case may be. This arrangement provides for a boxing in of the resilient rail seat 12 on the upper surface of its lips as well as on its longitudinal side surface, leaving the ends of the rail seat open to permit the slight amount of cold flow of the rail seat longitudinally of the traction rail. The slight amount of cold flow of the rail seat in a longitudinal direction of the traction rail T is not objectionable due to the extended length of the rail seat and its contact over this length with the flange 26 of the traction rail T. As will now be realized when referring to FIGURE 3, the application of a positive downward pressure by the bearing plates 14 on the rail seat, there is applied a continuous longitudinal line of pressure P on the upper surface of the rail base flange 26 along the portions of the flange which underlies the leg 36 of the bearing plate 14. Additionally, since there is a slight amount of cold flow in the longitudinal direction due to the leg 38 boxing in the longitudinal side wall of the rail seat, there is also developed a continuous line of inwardly directed pressure P' by the rail seat against the rail base flange 26.

The leg 38 of the bearing plate also functions to restrain any lateral movement caused by lateral rail load deflection, this eliminating the application of any side load on the bolts 30 of bolt means 16. Consequently, since the bolts are not subjected to a side load which would cause bending of the same, the gauge of the track structure is maintained at a predetermined setting. The lateral pressures referred to above usually result from the load being applied to the head of the traction rail T on track curves. While such lateral loads or pressures are somewhat compensated by providing a cant to the traction rail in a curve, such a cant or super elevation does not eliminate all lateral loads.

Referring now to FIGURES 4-6 there is disclosed a modified resilient rail seat 12' having a longitudinally extending groove 18' therein with the usual bolt holes 28' at the corners of the rail seat. The rail seat 12' differs from the rail seat 12 described above in that it is provided with a recess 50 in the upper surface of its lips 24', the recess 50 communicating with a recess 52 in its longitudinal side walls 40'. The recess 50 is arranged to receive the leg 36 of the bearing plate 14 whereas the recess 52 is arranged to receive the leg 38. By providing the recesses 50 and 52, the angle-shaped bearing plate 14 which has a comparable thickness to the depth of the recesses, lies flush with the surface of the rail seat and thus when the plate 14 is made of steel or other electrical conductive material, therei s less chance of electric current flash over between the rail and the plate and through the bolt.

In both the resilient rail seats 12 and 12', it will be noted that the longitudinal shoulders of the rail seat are rounded as indicated at 56. The purpose of rounding the shoulders at 56 is to provide a smooth contacting surface between the rail seat and the bearing plate 14, the bearing plate usually having a radius at the junction of its legs which is provided in the fabrication of the same.

Reference is now made to FIGURES 7 and 8 of the drawings wherein an improved resilient rail seat 12" is disclosed which makes the removal and replacement of the traction rail T much simpler than the rail seats shown in FIGURES 1 and 4. In the modification of FIGURES 7 and 8 the resilient rail seat 12" includes a body portion 60 having a longitudinally extending groove 62 therethrough of a width equal to the width of the base flange 26 of traction rail T and a depth equal to the thickness of the base flange at its outer marginal edges. The body portion 60 of rail seat 12" is separate from the lip portions 64 and 66. In more detail, each of the lip portions 64 and 66 is provided with a lower surface having a portion 68 which is planar and arranged to be complementary to the upper surface 70 of the body portion 60. Inwardly of the planar lower surface portion of the lips 64 and 66, the under surfaces of the same are curved as indicated at 72 so as to be complementary to the top surface of the base flange 26 of traction rail T. At the inner most end of each of the lips 64 and 66 an upwardly standing rib 74 is provided so that the end of the leg 36 of angle-shaped bearing plate 14 is spaced up from the web of the traction rail T.

Holes 28' and 28" are provided respectively in the body portion 60 and lip portions 64 and 66 for reception of the bolts 30. As will be appreciated, the angle-shaped bearing plate 14 is provided with holes 76 which align with the holes in the resilient pad.

An arrangement such as shown in FIGURES 7 and 8 permits easy removal and replacement of the traction rail T without lifting the traction rail a sufficient height to flex the rail seat off of the same. In the arrangement shown in FIGURES 7 and 8 the bearing plates 14 are first removed and then each of the lips 64 and 66 are removed thus leaving the traction rail T resting in the groove 62 of the body member 60. It will be appreciated that the traction rail need be elevated only high enough to clear the body member 60 and then it may be replaced with a new traction rail. In the environment shown in FIGURES 7 and 8 it is not necessary to remove the body member 70 of the resilient rail seat base from the supporting structure 15.

If desired, and instead of providing two removable lips as shown in FIGURE 7, one of the lips may be made integral with body member like the type shown in FIGURES 1 and 4 whereas the other lip can be of the type shown in FIGURES 7 and 8. If this arrangement is utilized, then the lip that is not integral with the body member is removed and the rail may be slipped out by tilting it along its longitudinal axis slightly until one edge of the same is above the area of the body member having the removable lip portion.

It will thus be seen that the objects and the advantages of the present invention have been fully and effectively accomplished by the structure illustrated in the drawings and described hereinbefore. However, the foregoing specific embodiments of the invention are subject to some changes without departing from the principles involved.

The terminology used throughout the specification is for the purpose of description and not limitation, the scope of the invention being defined in the claims.

What is claimed is:

1. An improved rail anchor and seat construction comprising: a traction rail having a base flange; a supporting structure for said traction rail; a preformed resilient rail seat member positioned between said traction rail and said supporting structure for supporting the traction rail on the supporting structure, said resilient rail seat member having a body portion with a rail base flange receiving cavity extending longitudinally in the upper surface of the same and a pair of lip portions at least overlying the marginal portions of the base flange; a pair of angle-shaped bearing plates, each of said angle-shaped bearing plates including one leg arranged to overlie one of the lips and bear against the same for applying a continuous line of pressure generally downwardly on said base flange and a second leg overlying the longitudinally extending side wall of the rail seat member and bearing against the same to apply a continuous line of pressure generally inwardly toward said rail base flange, said second leg being of such a shape and size that its bottom edge is spaced slightly from the upper surface of said supporting structure when said rail seat member is in a relaxed condition, but nearly engaging the upper surface of said supporting structure when a bolt means is applied to the rail anchor and seat construction to exert a positive pressure on the angle-shaped bearing plates; a bolt means extending through each of said angle-shaped plates and said rail seat member, said bolt means being anchored to said supporting structure for exerting positive pressure on and drawing said angle-shaped bearing plate downwardly to box in the rail seat member on its top and longitudinal sides.

2. The improved construction as claimed in claim 1 in which said rail seat member is provided with a rceess in the upper surface of each of the lip portions for receiving one of the legs of said angle-shaped bearing plates and a recess in the outer surface of each of its longitudinally extending side walls for receiving the second leg of each of said angle-shaped bearing plates.

3. The improved construction as claimed in claim 1 wherein the upper surface of each of the lips and the outer surface of the longitudinally extending side walls of said rail seat member are substantially planar.

4. The improved construction as claimed in claim 1 in which said angle-shaped bearing plates are formed from a rigid insulating material.

5. The improved construction as claimed in claim 4 wherein said rigid insulating material is fiberglass.

6. The improved construction as claimed in claim 4 wherein said rigid insulating material is nylon.

7. The improved construction as claimed in claim 1 in which the body portions and the lip portions of said resilient rail seat member are integrally formed.

8. The improved construction as claimed in claim 1 in which said lip portions of said resilient rail seat member are separate from said body portions whereby said rail base flange receiving cavity when said lip portions are removed is at least as wide as the rail base flange thereby permitting easy removal and replacement of the traction rail without removal of the body portion of the rail seat member from said supporting structure.

9. The improved structure of claim 1 in which each of said lip members is provided with an upwardly extending rib along its inner edge.

10. The improved construction as claimed in claim 1 in which at least one of said lip portions of said resilient rail seat member is separate from said body portion to thereby permit easy access to the base flange receiving cavity.

References Cited

UNITED STATES PATENTS

| | | | |
|---|---|---|---|
| 3,268,170 | 8/1966 | Moses | 238—283 |
| 3,223,328 | 12/1965 | Moses et al. | 238—25 |
| 3,189,279 | 6/1965 | Horniblow et al. | 238—283 |
| 2,162,599 | 6/1939 | Austin et al. | 238—283 |
| 1,119,580 | 12/1914 | Dithmer | 238—25 |

FOREIGN PATENTS

| | | |
|---|---|---|
| 793,608 | 10/1934 | France. |
| 922,658 | 4/1963 | Great Britain. |

ARTHUR L. LA POINT, *Primary Examiner.*

R. A. BERTSCH, *Assistant Examiner.*